(12) United States Patent
Anticaglia

(10) Patent No.: US 12,140,123 B2
(45) Date of Patent: Nov. 12, 2024

(54) SYSTEM AND METHOD FOR GENERATING ELECTRICITY

(71) Applicant: GRUPPO PICCINI S.P.A., Perugia (IT)

(72) Inventor: Giovanni Anticaglia, Pisa (IT)

(73) Assignee: GRUPPO PICCINI S.P.A., Perugia (IT)

( * ) Notice: Subject to any disclaimer, the term of this patent is extended or adjusted under 35 U.S.C. 154(b) by 0 days.

(21) Appl. No.: 18/010,856

(22) PCT Filed: Jun. 16, 2020

(86) PCT No.: PCT/IT2020/000049
§ 371 (c)(1),
(2) Date: Dec. 16, 2022

(87) PCT Pub. No.: WO2021/255763
PCT Pub. Date: Dec. 23, 2021

(65) Prior Publication Data
US 2023/0228257 A1   Jul. 20, 2023

(51) Int. Cl.
*F03G 3/00* (2006.01)
(52) U.S. Cl.
CPC .................. *F03G 3/094* (2021.08)
(58) Field of Classification Search
CPC ............... F03G 3/094; H02J 15/007
See application file for complete search history.

(56) References Cited

U.S. PATENT DOCUMENTS

| | | | |
|---|---|---|---|
| 7,973,420 B2 | 7/2011 | Scott | |
| 10,000,337 B2* | 6/2018 | Lindbo | G06Q 10/087 |
| 2020/0028379 A1* | 1/2020 | Pedretti | B66C 13/06 |
| 2022/0041372 A1* | 2/2022 | Austrheim | B61B 5/02 |

FOREIGN PATENT DOCUMENTS

| | | |
|---|---|---|
| DE | 4135440 A1 | 4/1993 |
| DE | 102007002122 A1 | 7/2008 |
| GB | 2578805 A | 5/2020 |

OTHER PUBLICATIONS

International Search Report and Written Opinion in corresponding International Patent Application No. PCT/IT2020/000049 mailed Feb. 25, 2021. 16 pages.
International Preliminary Report on Patentability in corresponding International Patent Application No. PCT/IT2020/000049 mailed Nov. 4, 2022. 17 pages.

* cited by examiner

*Primary Examiner* — Julio C. Gonzalez
(74) *Attorney, Agent, or Firm* — Leason Ellis LLP

(57) ABSTRACT

A system (100) for generating electricity comprising—at least one structure (1) defining an upper support surface (11) and a lower support surface (12); —a plurality of cranes (2, 2a, 2b, 2c, 2d, 2e) adapted to move a plurality of bodies (3) from the upper support surface (11) to the lower support surface (12), and vice versa; wherein each crane (2, 2a, 2b, 2c, 2d, 2e) is provided with—gripping means (21) adapted to grasp a body (3) of said plurality of bodies (3); —and a device (4) connected to the gripping means (21), adapted to transform into electricity the kinetic energy of a body (3) grasped by the gripping means (21), which moves, in particular substantially vertically, under the effect of gravity towards the lower support surface (12).

20 Claims, 7 Drawing Sheets

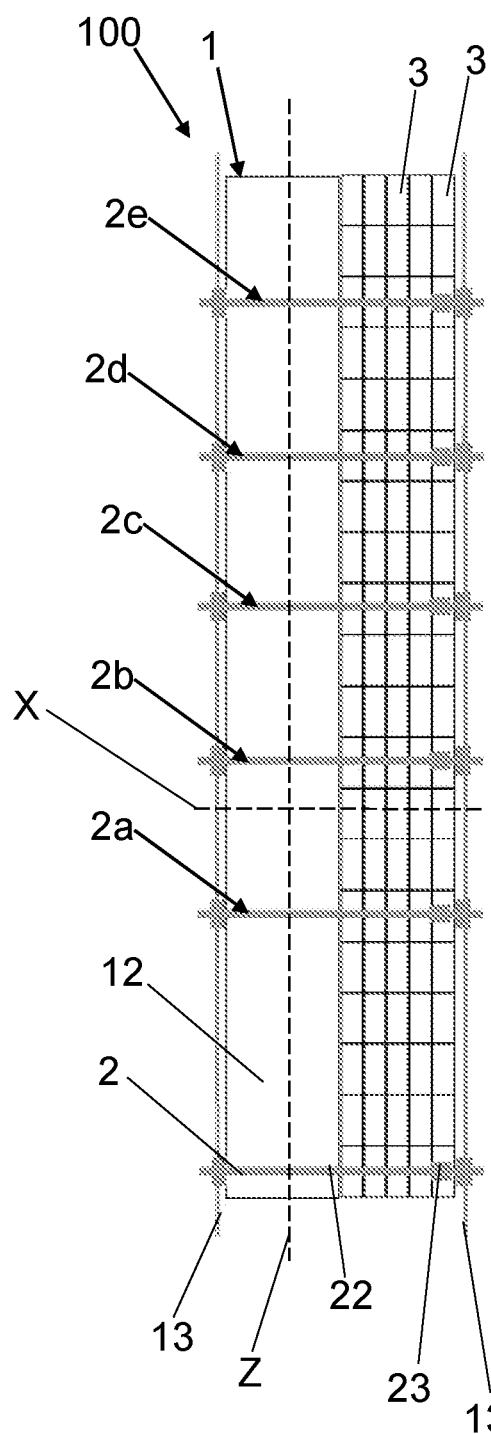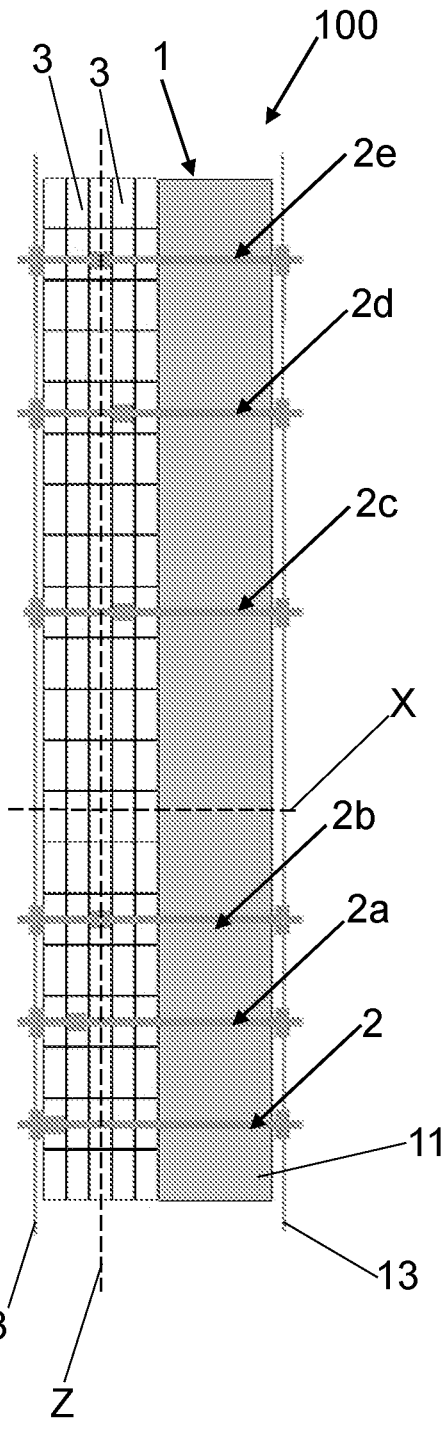

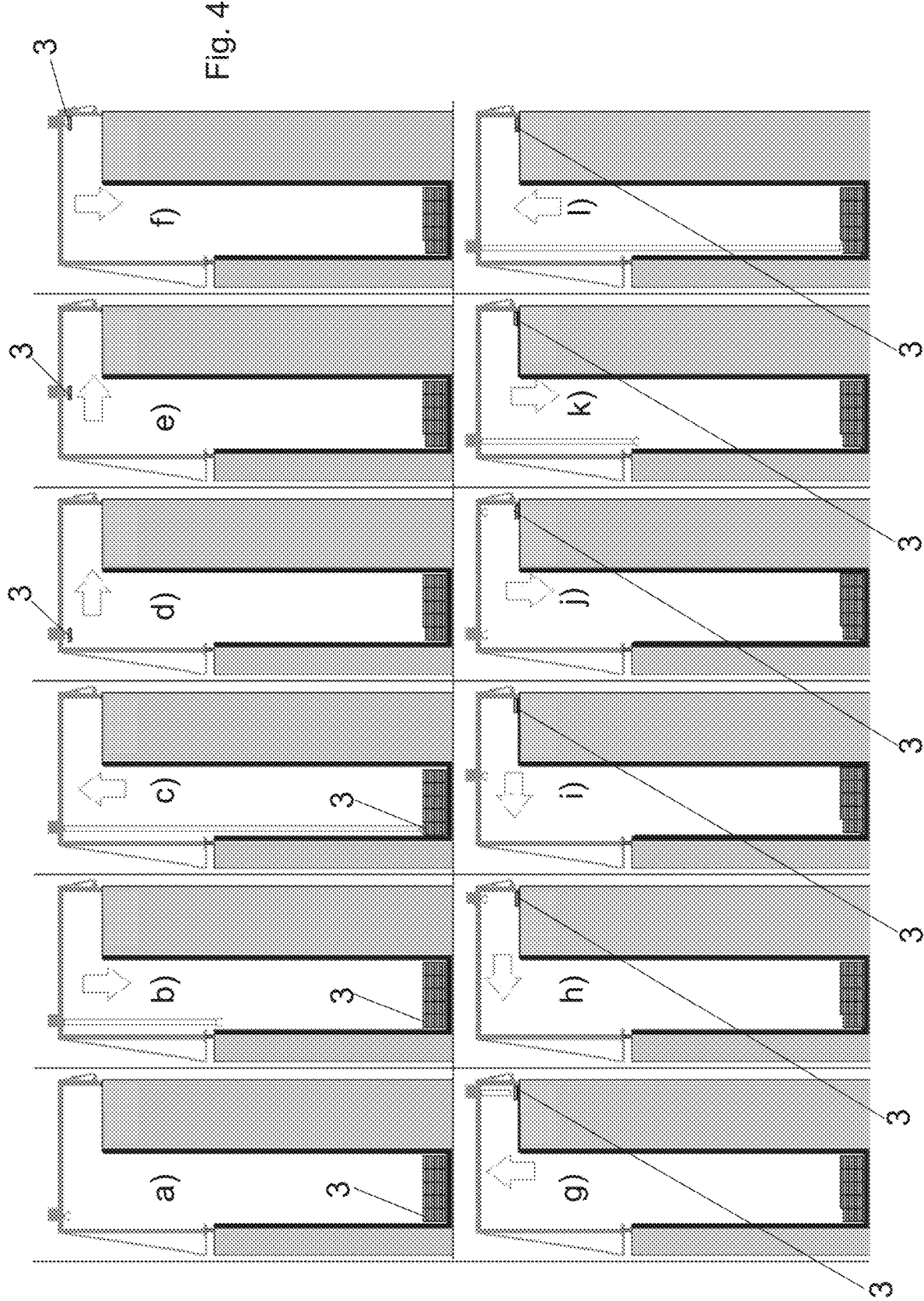

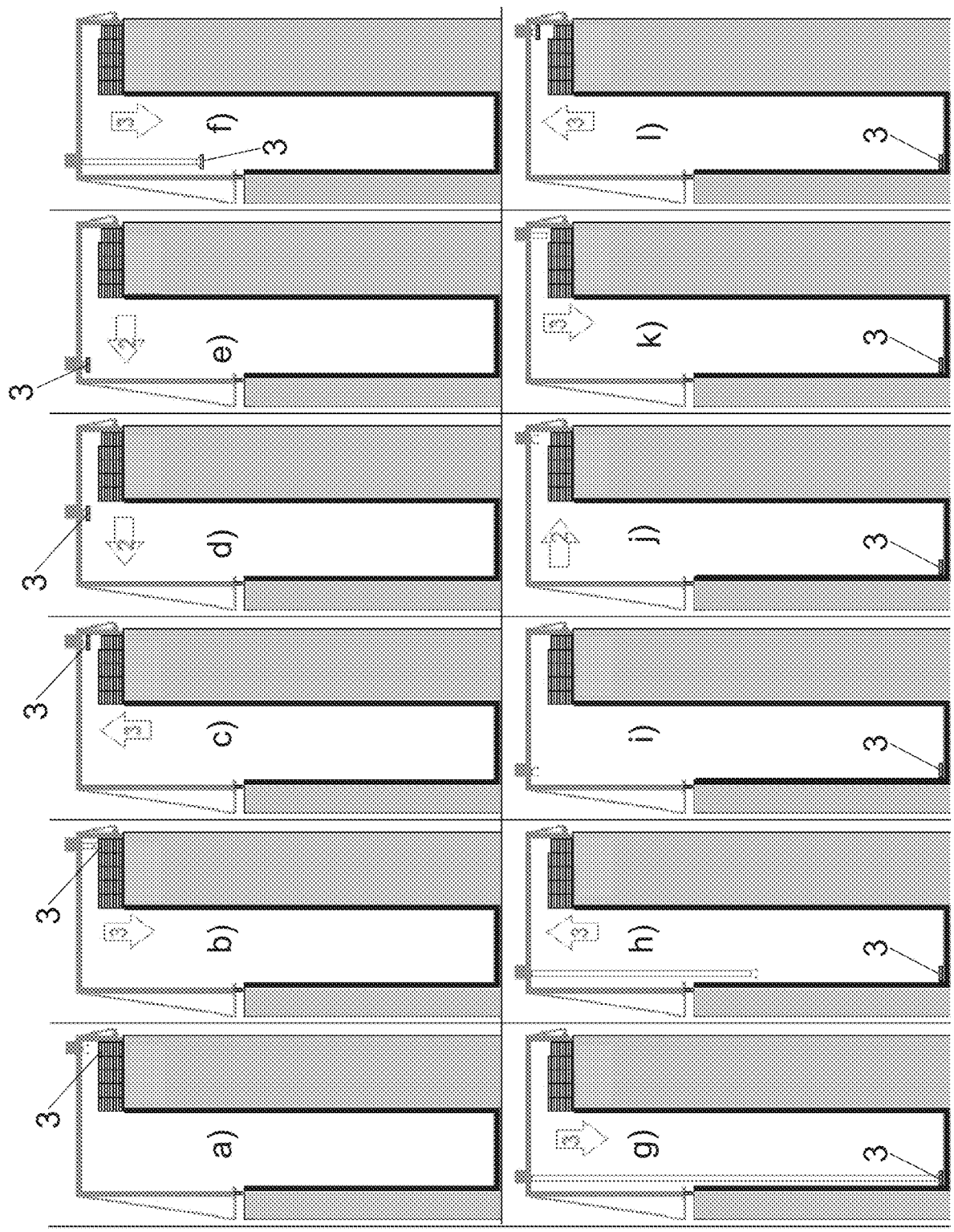

SYSTEM AND METHOD FOR GENERATING ELECTRICITY

CROSS-REFERENCE TO RELATED PATENT APPLICATIONS

This application is a U.S. National Stage Application under 35 U.S.C. § 371 of International Patent Application No. PCT/IT2020/000049 filed Jun. 16, 2020, which is incorporated by reference in its entirety. The International Application was published on Dec. 23, 2021, as International Publication No. WO 2021/255763 A1.

FIELD OF THE INVENTION

The present invention relates to the electricity generation field.

In particular, the invention relates to a system, or plant, and a method for transforming the kinetic energy of a body which moves under the effect of gravity into electricity.

BACKGROUND ART

The field of generating electricity by using renewable sources is of particular interest. One of the major limits of renewable energy sources, with respect to the production of energy with fossil or nuclear fuels, is the discontinuity over time thereof.

In particular, photovoltaic panels only generate energy when there is enough sunlight, and wind systems only when there is enough wind.

To allow renewable energy systems to completely replace fossil or nuclear fuel systems, it is necessary to put them in a condition ensuring continuity in the supply of electricity. This is possible only by associating them with energy storage systems. Conventionally, energy is stored in batteries.

One of the major limits of batteries is the need to periodically replace them after relatively short periods of use.

The need is therefore felt to be capable of generating electricity, in particular from renewable sources, so as to ensure the continuity of the electricity supply without the need to use batteries.

SUMMARY OF THE INVENTION

It is an object of the present invention to provide a system which allows generating electricity, in particular from the transformation of the kinetic energy of a body which moves under the effect of gravity, which allows ensuring the continuity of the electricity supply without the need to use batteries.

The present invention achieves at least the aforesaid object, and other objects which will become evident in the light of the present description, by means of a system for generating electricity comprising
  at least one structure defining an upper support surface and a lower support surface,
  a plurality of cranes adapted to move a plurality of bodies from the upper support surface to the lower support surface, and vice versa;
  wherein each crane is provided with
  gripping means adapted to grasp a body of said plurality of bodies;
  and a device connected to the gripping means, adapted to transform into electricity the kinetic energy of a body grasped by the gripping means, which moves, in particular substantially vertically, under the effect of gravity towards the lower support surface.

It is another object of the present invention to provide at least one method for generating electricity, ensuring the continuity of the electricity supply without the need to use batteries, by means of the aforesaid system.

The invention therefore also relates to a method, according to claim 17, wherein when a plurality of bodies is arranged on said upper support surface, at least one first crane performs the steps of:
  a) grasping a body arranged on the upper support surface by means of the gripping means;
  b) moving said body on the lower support surface, generating electricity when the device transforms into electricity the kinetic energy of a body grasped by the gripping means, which moves, in particular substantially vertically, under the effect of gravity towards the lower support surface;
  c) releasing said body on the lower support surface;
  d) bringing the gripping means above, in particular above and at, the upper support surface.

Advantageously, the system allows storing energy in the form of potential energy, with particular reference to the bodies arranged on the upper support surface (or upper rest surface). The potential energy of the bodies arranged on the upper support surface can advantageously be transformed into kinetic energy which in turn is transformed into electricity, which can be distributed, as needed.

Advantageously, the environmental impact is minimal, both for the construction of the system itself, and for the almost total absence of materials to be disposed of for the maintenance thereof during the years of operation.

Furthermore, advantageously, the system may be built and made operational substantially in any part of the emerged world, mainly using locally available materials, and may be expanded without limits, even after being put into operation. From a functional point of view, the system may be assimilated to a battery system, with the advantage, with respect to batteries, that it does not require the cyclic replacement of the elements after a period of time which is still relatively short for batteries.

The number of cranes may be defined on the basis of the power peaks which are to be satisfied and the average power which is intended to be ensured for the electricity network powered.

It is particularly preferable that the number of cranes is at least equal to six.

This number of cranes allows the continuous repositioning of the cranes so as to ensure both the energy for the self-sustenance of the system, and the possibility of supplying electricity to the network without interruption.

Each crane preferably corresponds to a respective portion of the upper support surface and a respective portion of the lower support surface.

Further features and advantages of the invention will become more evident in the light of the detailed description of exemplary but not exclusive embodiments.

The dependent claims describe particular embodiments of the invention.

BRIEF DESCRIPTION OF THE FIGURES

In the description of the invention, reference is made to the attached drawing tables, which are provided by way of explanation and not by way of limitation, in which:

FIG. 3A diagrammatically shows a top plan view of the system of FIG. 2A;

FIG. 3B diagrammatically shows a top plan view of the system of FIG. 2B;

FIGS. 4*a* to 4*l* diagrammatically show an operating sequence of the system of FIG. 1, shown frontally from the side;

FIGS. 5*a* to 5*l* diagrammatically show another operating sequence of the system of FIG. 1, shown frontally from the side;

The same elements, or functionally equivalent elements, have the same reference numeral.

DESCRIPTION OF EMBODIMENTS OF THE INVENTION

Figure 1:
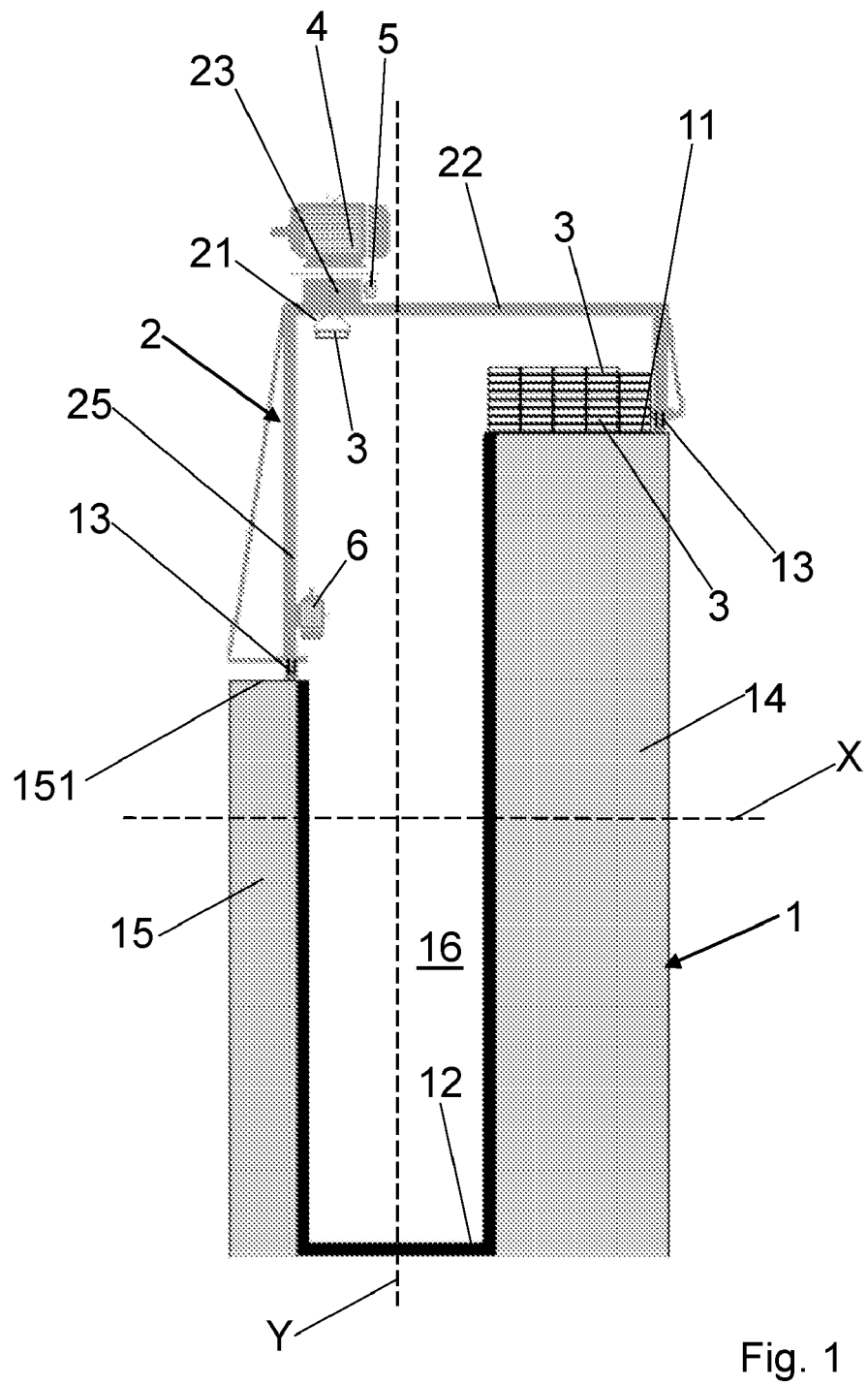
FIG. 1 diagrammatically shows a front side view of a system in accordance with the invention.

With reference to the Figures, a system 100, or plant, for generating electricity is described.

The system 100 comprises
- at least one structure 1 defining an upper support surface 11 and a lower support surface 12;
- a plurality of cranes 2, 2*a*, 2*b*, 2*c*, 2*d*, 2*e* adapted to move a plurality of bodies 3 from the upper support surface 11 to the lower support surface 12, and vice versa;
- wherein each crane 2, 2*a*, 2*b*, 2*c*, 2*d*, 2*e* is provided with gripping means 21 adapted to grasp a body 3 of said plurality of bodies 3;
- and a device 4 connected to the gripping means 21, adapted to transform into electricity the kinetic energy of a body 3 grasped by the gripping means 21, which moves, in particular substantially vertically, under the effect of gravity towards the lower support surface 12.

When the body 3 moves under the effect of gravity towards the lower support surface 12, the body 3 is, substantially, falling. More in detail, the fall is controlled, or guided, in particular, by the device 4 and by the gripping means 21.

The expression "substantially vertically", means, in particular, along or parallel to a vertical axis Y. The vertical axis Y is, in particular, an axis substantially orthogonal to the ground, where the structure 1 is arranged.

During the description, reference will also be made to an axis X and to an axis Z, which are perpendicular to one another and to the axis Y. The axis X and the axis Z are, in particular, horizontal axes.

There is a height difference between the upper support surface 11 and the lower support surface 12, i.e. the upper support surface 11 and the lower support surface 12 are at a different heights. In particular, the upper support surface 11 is at a greater height with respect to the lower support surface 12.

Preferably, the height difference between the upper support surface 11 and the lower support surface 12 is of at least 4.5 meters, preferably of at least 6 m; it preferably is from 30 to 60 or from 30 to 50 m. The aforesaid height difference is measured, in particular, along the axis Y.

The upper support surface 11 and the lower support surface 12 are preferably offset with respect to each other, in particular with respect to the axis X. Therefore, substantially, there is a step between the upper support surface 11 and the lower support surface 12. The height of such step, parallel to the axis Y, corresponds to the aforesaid height difference.

Preferably, the upper support surface 11 and the lower support surface 12 are substantially flat.

The device 4 serves for the movement, parallel to the axis Y (i.e., for a vertical movement), of the gripping means 21, and therefore also of a body 3 grasped by the gripping means 21.

The device 4, and also the motor 5 and the motor 6 mentioned below, are diagrammatically shown in FIG. 1, where also the arrangement thereof is diagrammatically shown.

The device 4 is preferably configured to allow a descent of the body 3 by gravity along a first stretch, and to brake the descent of the body 3 along a second stretch. Thereby, the body 3, which is descending, may be gently braked. The second stretch has a shorter length, in particular much shorter, with respect to the first stretch. In particular, along the first stretch, all the energy produced is fed into the network. Along the second stretch, part of the energy produced is used to perform the braking action.

The device 4 is preferably adapted to act as a motor, in particular to move a body 3 grasped by the gripping means 21 upwards. Therefore, the device 4 is substantially a motor/generator.

In particular, the device 4 acts as an electricity generator when it transforms the kinetic energy of the body 3 which moves downwards by gravity, and as a motor (i.e., it absorbs electricity) when it carries a body 3 upwards.

Preferably, the system 100 comprises at least six cranes 2, 2*a*, 2*b*, 2*c*, 2*d*, 2*e*.

It is particularly preferable that the number of cranes 2, 2*a*, 2*b*, 2*c*, 2*d*, 2*e* is at least equal to six because this number allows the continuous repositioning of the cranes so as to ensure both the energy for the self-sustenance of the system, and the possibility of supplying electricity to the network without interruption.

Preferably, the number of cranes 2, 2*a*, 2*b*, 2*c*, 2*d*, 2*e* is at least twelve or equal to twelve; more preferably, at least fourteen or equal to fourteen, to ensure a better fault tolerance.

Exclusively by way of example and not by way of limitation, in FIGS. 3A and 3B the number of cranes 2, 2*a*, 2*b*, 2*c*, 2*d*, 2*e* is equal to six.

Preferably, each crane 2, 2*a*, 2*b*, 2*c*, 2*d*, 2*e* is a bridge crane, optionally a wheeled bridge crane, or a gantry crane. In the examples described, the cranes are gantry cranes.

Each crane 2, 2*a*, 2*b*, 2*c*, 2*d*, 2*e* is preferably provided with
- a guide 22, or bridge, which extends above, in particular above and at, the upper support surface 11, and above, in particular above and at, the lower support surface 12;
- and a carriage 23 constrained to the guide 22 and adapted to slide along the guide 22.

The gripping means 21 are constrained to the carriage 23.

The guide 22, or bridge, is adapted, in particular, to guide the movement of the carriage 23 parallel to the axis X (defined above). The axis X extends, in particular, in a direction which goes from the upper support surface 11 to the lower support surface 12.

The guide 22 is connected to two legs 25, 26, and, in particular, the longer length of the guide 22 extends perpendicularly to the legs 25, 26. The legs 25, 26 are below the guide 22.

Each crane 2, 2a, 2b, 2c, 2d, 2e is provided with a motor 5 (also called "first motor" for descriptive purposes) to move the carriage 23 and the respective gripping means 21 along said guide 22 from a position above, in particular above and at, the upper support surface 11 to a position above, in particular above and at, the lower support surface 12, and vice versa.

The gripping means 21 are constrained to the carriage 23 by means of at least one cable 24a, 24b (for example, two cables) adapted to be wound and unwound, in particular, to vary the extension thereof, in particular, parallel to the axis Y. For this purpose, the device 4 preferably comprises a winch. The device 4 is preferably constrained, in particular integrally constrained, to the carriage 23.

Preferably, each crane 2, 2a, 2b, 2c, 2d, 2e is adapted to move parallel to the axis Z (defined above), in particular to be capable of moving the gripping means 21 above the upper support surface 11, so that it can be positioned according to the position of the body 3 to be picked up or according to the position where the body 3 is to be arranged. In other words, the gripping means 21 can be moved in various positions above and at the upper support surface 11.

For this purpose, for each crane 2, 2a, 2b, 2c, 2d, 2e a second motor 6 is provided, which allows the movement of the respective crane 2, 2a, 2b, 2c, 2d, 2e, and therefore allows the movement of the respective gripping means 21 above the upper support surface 11.

In particular, at least one rail 13 is provided to which each crane 2, 2a, 2b, 2c, 2d, 2e is constrained. Each crane 2, 2a, 2b, 2c, 2d, 2e is adapted to slide with respect to the rail 13 by means of the motor 6. The rail 13, for example, is part of the structure 1.

The gripping means 21 may comprise, exclusively by way of explanation, hooks.

The motor 6 may for example be arranged in a position proximal with respect to the leg 26 or to the leg 25 of the respective crane 2, 2a, 2b, 2c, 2d, 2e.

The cranes 2, 2a, 2b, 2c, 2d, 2e can preferably perform movements, in particular parallel to the axes X, Y, Z, independently of one another.

Preferably, each body 3 has a weight of at least 1 ton; preferably from 4 to 20 tons.

Preferably, the bodies 3 have the same shape, preferably a parallelepiped shape; and/or the bodies 3 have the same weight.

Depending on the needs, it may however be provided that at least some bodies 3 have different shapes and/or weights with respect to one another. For example, two or more groups of bodies may be provided. The bodies of each group are equal to one another, and are different from another group of bodies.

The parallelepiped shape is however preferred.

The bodies 3 are, in particular, made so as to be resistant to impacts, bending and pressure.

Each body 3 is preferably provided with means, in particular mechanical means, which allow a rapid and safe gripping of the gripping means 21.

Preferably, the system 100 comprises means for generating electricity from renewable sources (not shown), also called renewable energy systems or plant/s, in particular, photovoltaic and/or wind means for generating electricity. For example, the system may comprise one or more wind turbines and/or one or more solar panels. Said means are adapted to power, in particular, the device 4, in particular, when it acts as a motor to move a body 3 grasped by the gripping means 21 upwards.

The device 4, the motor 5 and the motor 6 are, in particular, electric motors.

The system also comprises an electronic control apparatus (not shown).

The device 4 is also capable of controlling the descent speed of the body 3, in particular, by means of said electronic control apparatus (not shown).

In particular, the electronic control apparatus is configured to control, in particular, the speed of movement of a body 3 grasped by the gripping means 21 which moves, in particular substantially vertically, under the effect of gravity towards the lower support surface 12.

The power with which the electricity generated is fed into the network to power one or more user devices depends on the descent speed.

The electronic control apparatus is also adapted to control the movement of the cranes 2, 2a, 2b, 2c, 2d, 2e in general, according to the amount of energy required by one or more user apparatuses powered by the system 100.

The electronic control apparatus, or system, is in particular configured to manage the device 4, and the motors 5, 6 of the cranes 2, 2a, 2b, 2c, 2d, 2e, in particular so as to ensure, at any time:

when the system 100 acts as a generator, the exact production of the electricity required, to avoid waste, when the system 100 is in the storing step, the storage in potential energy, so as to fully use all the energy, not directly used, made available by renewable energy plants.

Preferably, the aforesaid structure 1 comprises two parts 14, 15, between which there is a space 16. The space 16 may, exclusively by way of example, be an excavation or a ditch, for example made in the ground, or the space between two walls.

A first part 14 of said two parts 14, 15 defines said upper support surface 11, and the bottom of said space 16 defines said lower support surface 12.

In the example described in FIGS. 1 to 5, each crane 2, 2a, 2b, 2c, 2d, 2e is arranged on a surface 151 defined by a second part 15 of said two parts (14, 15) and on said upper support surface 11. In particular, for each crane, one leg 25 rests on the surface 151, and the other leg 26 rests on the upper support surface 11.

The surface 151 is preferably at a height between the upper support surface 11 and the lower support surface 12.

In this example, the legs 25, 26 of each crane 2, 2a, 2b, 2c, 2d, 2e have a different height with respect to one another, and, in particular, they are strongly unbalanced.

In more detail, in the example described, the leg 26 resting on the upper support surface 11 is shorter than the leg 25 resting on the surface 151.

This solution offers the possibility of not leaving waste in the construction of the system 100. Exclusively by way of explanation, the earth extracted from the excavation may be used to make the bodies 3 and, possibly, the part 14, if the morphology and consistency of the soil allow it.

Figure 6:
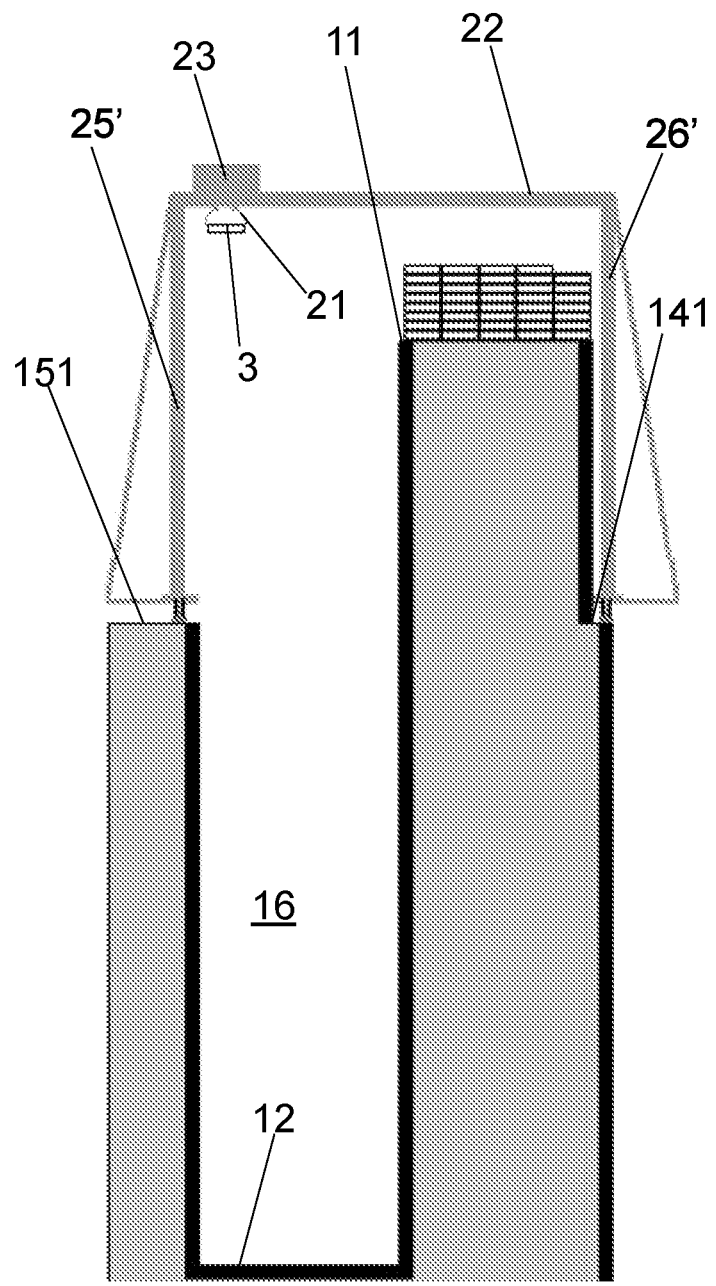
FIG. 6 shows a variant of the system of FIG. 1.
Figure 7A:
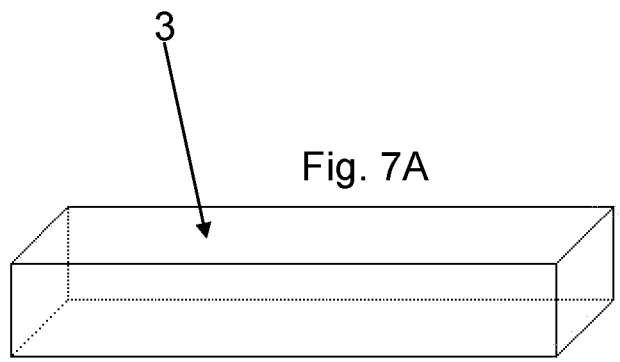
FIG. 7A diagrammatically shows a perspective view of a component of the system in accordance with the invention.
Figure 7C:
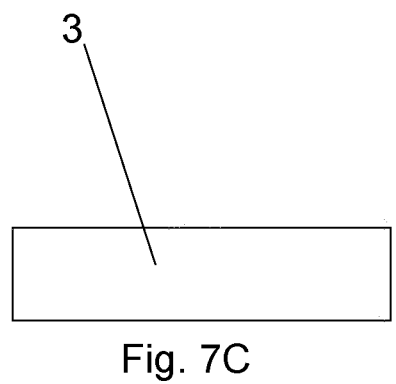
FIG. 7C diagrammatically shows a front view of another side of the component of FIG. 7A.
Figure 7B:
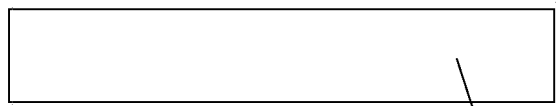
FIG. 7B diagrammatically shows a front view of a side of the component of FIG. 7A.

In a variant, shown in FIG. 6, each crane 2, 2a, 2b, 2c, 2d, 2e is arranged on said surface 151 defined by the second part 15 and on a surface 141 defined by said first part 14, arranged at a height comprised between said upper support surface 11 and said lower support surface 12.

Preferably, said surface 141 and said surface 151 are substantially at the same height.

In this case, the legs 25', 26' substantially have the same height, and preferably substantially have the same size.

This second solution allows a greater standardization of the cranes and a production thereof much more independent from the particularity of the soil where the system is constructed.

The person skilled in the art is capable of understanding that other configurations are also possible according to the system to be constructed. For example, a plant may be constructed in which the gantry cranes may have a configuration intermediate between the two examples described.

The operation of the system 100 is described in more detail below.

Figures 2A, 2B:
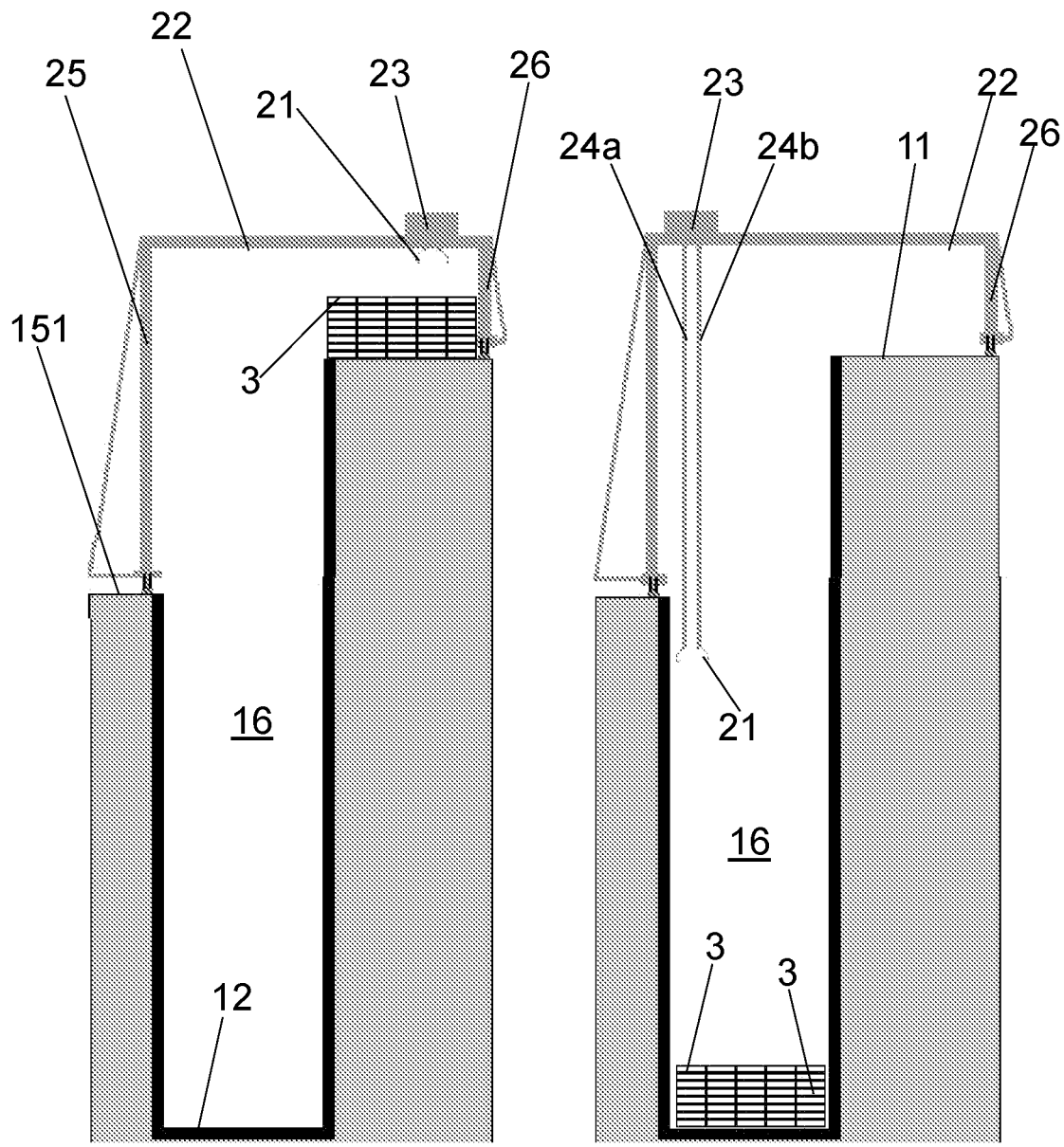
FIG. 2A diagrammatically shows a front side view of the system of FIG. 1 in a first state.
FIG. 2B diagrammatically shows a front side view of the system of FIG. 1 in a second state.

FIGS. 2A and 2B diagrammatically show side views of a system 100 in two different states or configurations. In the state of FIG. 2A, all the bodies 3 are arranged on the upper support surface 11. Therefore, the system 100 has the maximum load of energy, in the form of potential energy. In the state of FIG. 2B, all the bodies 3 are arranged on the lower support surface 12. Therefore, to be again capable of producing energy, at least one body 3, for example all the bodies 3, must be returned to the upper support surface 11.

When at least one body 3 is arranged on the upper support surface 11, the energy is stored in the form of potential energy. The energy is subsequently returned, in the form of electricity, by one or more devices 4 which are powered by the descent movement of the bodies 3.

FIGS. 3A and 3B show, respectively, a top view of the system in the state of FIG. 2A and in the state of FIG. 2B.

Substantially, the system 100 has two distinct modes of operation: in one mode, it absorbs electricity from the means for generating electricity from renewable sources (of the photovoltaic and/or wind type), and in another mode, it produces electricity by feeding it into the network.

In the presence of renewable energy, when sunlight is there for photovoltaic systems and/or wind is there for wind systems, the system 100 absorbs energy, in particular it absorbs energy completely. Of the absorbed energy, a small part is used for the management of the system 100. The energy for the management of the system 100 is substantially used for the movements carried out by the motor 5 and the motor 6 of all the operational cranes 2, 2a, 2b, 2c, 2d, 2e and for the power supply of the entire control electronic and electrical part of the system 100.

Most of the energy absorbed is used by the device 4 (or by the devices 4), when it acts as a motor, in particular to lift the bodies 3 from the lower support surface 12 to the upper support surface 12. Thereby energy is stored in the form of potential energy.

FIGS. 4a-4l show the sequence of a complete positioning cycle of a body 3 for storing energy, i.e., the transformation into potential energy and the storage of the electricity received by the renewable energy systems.

In FIG. 4, the arrows indicate the movement which is or will be performed from that position. In this sequence, the device 4 acts as a motor, in particular, almost exclusively as a motor.

Starting from an initial position (FIG. 4a), the gripping means 21 are lowered (FIG. 4b), by means of the device 4, to the position in which the gripping means 21 may grasp a body 3 (FIG. 4c), positioned in the minimum potential energy state thereof, i.e., arranged on the lower support surface 12. The body 3 is then lifted as shown in FIG. 4d. In this lifting step, the electricity which powers the device 4 is almost completely transformed into the potential energy acquired by the body 3, which passes from the minimum to the maximum potential energy position thereof.

With reference to FIG. 4e, the body 3 is then brought, using the motor 5, from the pick-up area, at the lower support surface 12, to the destination area, at the upper support surface 11. The body 3 is then lowered into its position on the upper support surface 11 (FIG. 4f) and freed from the gripping means 21 (FIG. 4g). The gripping means 21 then go back to the initial position (FIG. 4h-4i). FIGS. 4j, 4k, 4l substantially correspond to FIGS. 4a, 4b, 4c, respectively, so as to be capable of picking up another body 3, and the sequence continues as defined above.

With reference to FIGS. 5a-5l, in the absence of renewable energy, when the system 100 must supply energy to the network, the energy is generated by taking it from the potential energy of the bodies 3 arranged on the upper support surface 11. FIG. 5 shows, from a) to l), a complete energy transformation cycle from potential energy to electricity.

Starting from an initial position (FIG. 5a) the gripping means 21 are lowered on the body 3 to be picked up (FIG. 5b). After being grasped, the body 3 is slightly raised (FIG. 5c), parallel to the axis Y, to allow the horizontal movement thereof, parallel to the axis X. For the aforesaid lifting, the device 4 acts as a motor. The body 3 is then moved using the motor 5, until reaching the position, at the lower support surface 12, corresponding to the vertical destination of what will be the new position of the body 3 (FIGS. 5d and 5e).

With reference to FIGS. 5f and 5g, the body 3 is then brought to the position of minimum potential energy, i.e., it is arranged on the lower support surface 12.

During these steps (FIGS. 5f and 5g), the device 4, acting as a generator, produces electricity to be fed into the network. The power with which this energy is fed depends on the descent speed, which is regulated by the electronic control system or apparatus.

At the end of the steps of FIGS. 5h and 5i, the gripping means 21 are returned to the position of FIG. 5a, from which a new movement sequence (FIGS. 5j, 5k, 6l) of another body 3 starts, from the maximum potential energy position thereof to the minimum energy one, with the feeding of electricity into the network, as described above.

In the preferred operating mode, in the absence of renewable energy, therefore when the system 100 must supply energy to the network, at least one of the cranes 2, 2a, 2b, 2c, 2d, 2e is constantly in operation, so as to ensure the energy to manage the system 100.

This independently of the amount of energy which the system 100 must supply outside to meet the needs of the network users. A software algorithm, run by the electronic control apparatus, acting on the control parameters of the device 4 of all the operational cranes 2, 2a, 2b, 2c, 2d, 2e, regulates the descent speed of the bodies 3 so that constantly there is a global transformation of potential energy into electricity, only of the amount necessary to guarantee the energy to manage the system 100 and the electricity required by the network. The same algorithm controls the motor 5 and the motor 6 to position the cranes 2, 2a, 2b, 2c, 2d, 2e and the gripping means 21 to grasp and release the bodies 3, so that no stall condition of the system 100 may be obtained, which would cease the feeding of electricity into the network, and to avoid the total block of the whole system 100 until the return of the energy produced from renewable sources. For this reason, when in the condition of absence of renewable energy, at least two cranes are always kept fixed, with the bodies 3 at the top, as shown in FIGS. 1 and 6, in a condition to immediately supply energy and avoid possible blockages generated from any anomalies in the management software or from accidental failures which may occur in the mechanical or electrical parts of the system 100.

The energy to manage the system 100, as already mentioned, is a minimum amount of the energy treated as a whole by the system 100 and it falls within the definition of overall efficiency of the system 100 which is the ratio between the energy received and returned.

Among the most advantageous aspects of the system 100, there is the modularity thereof, intended as the possibility of expansion and reduction, in particular by adding or removing one or more cranes.

Furthermore, advantageously, the cranes 2, 2a, 2b, 2c, 2d, 2e are partially or completely independent from one another.

It is also important to highlight that the system 100 is capable of providing energy with immediate effect.

Note the position shown in FIGS. 1 and 6, in which the gripping means 21 grasp a body 3 and are arranged at the lower support surface 12, in particular at a height higher with respect to the upper support surface 11.

Such position may substantially be an electricity supply waiting position which allows, upon request, to immediately feed energy into the network, without problems of inertia or full-capacity reaching times.

The number of cranes 2, 2a, 2b, 2c, 2d, 2e is a design feature relevant for the system 100. The greater this number is—once defined the size features of the bodies 3, the size of the cranes and the size of the space 16 (in particular the depth thereof, i.e., the length of the height difference)—the greater the performance of the system will be, and in particular:

the ability to generate energy in average value,
the ability to immediately achieve energy peaks;
fault tolerance;
the programmed stop frequency of the cranes, for maintenance operations and therefore the possibility of implementing a mode of use which allows the need for the complete replacement thereof to be unlimitedly stretched.

In general, a method for generating electricity by means of a system 100, provides that, when a plurality of bodies 3 is arranged on said upper support surface 11, at least one crane 2 performs the steps of:

a) grasping a body 3 arranged on the upper support surface 11 by means of the gripping means 21;
b) moving said body 3 on the lower support surface 12, generating electricity when the device (4) transforms into electricity the kinetic energy of a body 3 grasped by the gripping means 21, which moves, in particular substantially vertically, under the effect of gravity towards the lower support surface 12;
c) releasing said body 3 on the lower support surface 12;
d) bringing the gripping means 21 above the upper support surface 11.

In particular, following step d), said at least one crane 2 performs again steps a), b), c), d), in particular continuously, until bodies 3 are present on the upper support surface 11.

Furthermore, as explained above, preferably at least two cranes are in the position, or state, in which the gripping means 21 grasp a body 3 and are arranged at the upper support surface 12, at a height greater with respect to the upper support surface 11, ready to generate energy (FIGS. 1 and 6).

When said at least one crane 2 stops generating electricity, in particular at the end of step b), at least one second crane 2a, 2b performs said step b), said step c) and said step d).

Step b), in particular, comprises one first step (b1) in which energy is generated; and a second step (b2), or final descent step, which, in particular, is very short, in which part of the energy produced is used to make the body 3, which is descending, perform a braking action, in particular a gentle braking action.

Example 1

System capable of supplying about 0.5 MWh (megawatt-hour) for about 12 hours.

Volume of each body 3: 5 m³, for example 5×2×0.5 m;
Weight of each body 3: 10 t (tons), i.e., 10,000 kg;
Height of each crane 2, 2a, 2b, 2c, 2d, 2e: 20 m, where height means the height of each crane with respect to the surface 151, which preferably substantially coincides with the height with respect to the ground;
Number of cranes 2, 2a, 2b, 2c, 2d, 2e: six, preferably twelve or fourteen;
Type of cranes: preferably gantry cranes;
Height difference between the upper support surface 11 and the lower support surface 12: about 50 m;
Height difference between the ground and the lower support surface 12 (which preferably coincides with the height difference between the surface 151 and the lower support surface 12): 35 m.
Width of the space 16 (parallel to the axis X), i.e., distance between the part 14 and the part 15: 10 m;
Length of the space 16 (parallel to the axis Z), i.e., length of the parts 14 and 15: 600 m.
Considering five columns side-by-side, each comprising eight superimposed bodies 3 (4 linear m height total):
Number of bodies 3: 8×5=40.
Each body 3, arranged on the upper support surface 11, may generate an energy equal to: 10000×9.8×50=about 5 MW. 40×5=200 MW i.e., each column may supply 0.5 MW for 400 seconds.
Ten columns supply 0.5 MW for one hour; 120 columns provide 0.5 MW for 12 hours.

In the calculation of the energy, the efficiency of the system has not been taken into account or has been taken into account in an approximate manner.

Example 2

System capable of supplying about 1 kWh for about 12 hours.

Volume of each body 3: 0.5 m³, for example 2×1×0.25 m;
Weight of each body 3: 1 t;
Number of cranes 2, 2a, 2b, 2c, 2d, 2e: six, preferably twelve or fourteen;
Type of cranes: preferably gantry cranes;
Height difference between the upper support surface 11 and the lower support surface 12: about 4.5 m;
Width of the space 16 (parallel to the axis X), i.e., distance between the part 14 and the part 15: 8 m.
Length of the space 16 (parallel to the axis Z), i.e., length of the parts 14 and 15: 48 m;
Height difference between the ground and the lower support surface 12 (which preferably coincides with the height difference between the surface 151 and the lower support surface 12): 3 m;
Length of the leg 25: 4 m;
Length of the leg 26: 3 m.
Considering five columns side-by-side, each comprising eight superimposed bodies 3 (2 linear m height total):
Number of bodies 3: 8×5=40.

Each body 3, arranged on the upper support surface 11, may generate an energy equal to: 1000×9.8×4.5=about 45 kW.

45×40=1800 kW i.e., each column may supply 1 kW for 1800 seconds.

Twenty-four columns provide 1 kW for 12 hours.

In the calculation of the energy, the efficiency of the system has not been taken into account or has been taken into account in an approximate manner.

The invention claimed is:

1. A system for generating electricity comprising
at least one structure defining an upper support surface and a lower support surface;
a plurality of cranes adapted to move a plurality of bodies from the upper support surface to the lower support surface, and vice versa;
wherein each crane is provided with
a hook adapted to grasp a body of said plurality of bodies;
and a motor/generator connected to the hook, adapted to transform into electricity the kinetic energy of a body grasped by the hook, which moves, in particular substantially vertically, under the effect of gravity towards the lower support surface;
wherein said motor/generator is adapted to act as a motor to move a body grasped by the hook upwards;
wherein each crane is provided with
a guide, or bridge, which extends above the upper support surface and above the lower support surface;
and a carriage constrained to the guide; the carriage being adapted to slide along the guide;
wherein the hook is constrained to the carriage;
wherein the guide, or bridge, is adapted to guide the movement of the carriage parallel to an axis (X), which is perpendicular to a horizontal axis (Z), the axis (X) and the horizontal axis (Z) being perpendicular to a vertical axis (Y);
wherein each crane is provided with a first motor to move the carriage and the hook along said guide from the upper support surface to the lower support surface, and vice versa;
wherein for each crane a second motor is provided to move the respective crane along the horizontal axis (Z), so as to move the hook above the upper support surface;
wherein at least one rail is provided;
and wherein each crane is constrained to said at least one rail and is adapted to slide with respect thereto by means of said second motor to move the hook above the upper support surface.

2. The system according to claim 1, comprising at least six cranes.

3. The system according to claim 1, wherein each crane is a bridge crane or a gantry crane.

4. The system according to claim 1, wherein the hook is constrained to the carriage by means of at least one cable adapted to be wound and unwound, in particular to vary the extension thereof.

5. The system according to claim 1, wherein the height difference between the upper support surface and the lower support surface is of at least 4.5 m.

6. The system according to claim 1, wherein each body has a weight of at least 1 ton.

7. The system according to claim 1, wherein the bodies have the same shape; and/or wherein the bodies have the same weight.

8. The system according to claim 1, comprising means for generating electricity from renewable sources adapted to power said motor/generator when said motor/generator acts as a motor to move a body grasped by the hook upwards.

9. The system according to claim 1, wherein said structure comprises a first structure and a second structure, between which there is an excavation or a ditch;
wherein the first structure defines said upper support surface; and
wherein a bottom of said excavation or a ditch defines said lower support surface.

10. The system according to claim 9, wherein each crane is arranged on a surface defined by the second structure and on said upper support surface, said surface being at a height comprised between the upper support surface and the lower support surface; or wherein each crane is arranged on said surface defined by the second structure and on a surface defined by said first structure, arranged at a height between the height of said upper support surface and the lower support surface.

11. A system for generating electricity comprising
at least one structure defining an upper support surface and a lower support surface;
a plurality of cranes adapted to move a plurality of bodies from the upper support surface to the lower support surface, and vice versa;
wherein each crane is provided with
a gripping means adapted to grasp a body of said plurality of bodies;
and a motor/generator connected to the gripping means, adapted to transform into electricity the kinetic energy of a body grasped by the gripping means, which moves, in particular substantially vertically, under the effect of gravity towards the lower support surface;
wherein said motor/generator is adapted to act as a motor to move a body grasped by the gripping means upwards;
wherein each crane is provided with
a guide, or bridge, which extends above the upper support surface and above the lower support surface;
and a carriage constrained to the guide; the carriage being adapted to slide along the guide;
wherein the gripping means is constrained to the carriage;
wherein the guide, or bridge, is adapted to guide the movement of the carriage parallel to an axis (X), which is perpendicular to a horizontal axis (Z), the axis (X) and the horizontal axis (Z) being perpendicular to a vertical axis (Y);
wherein each crane is provided with a first motor to move the carriage and the gripping means along said guide from the upper support surface to the lower support surface, and vice versa;
wherein for each crane a second motor is provided to move the respective crane along the horizontal axis (Z), so as to move the gripping means above the upper support surface;
wherein at least one rail is provided;
and wherein each crane is constrained to said at least one rail and is adapted to slide with respect thereto by means of said second motor to move the gripping means above the upper support surface.

12. The system according to claim 11, comprising at least six cranes.

13. The system according to claim 11, wherein each crane is a bridge crane or a gantry crane.

14. The system according to claim 11, wherein the gripping means is constrained to the carriage by means of at least one cable adapted to be wound and unwound, in particular to vary the extension thereof.

15. The system according to claim 11, wherein the height difference between the upper support surface and the lower support surface is of at least 4.5 m.

16. The system according to claim 11, wherein each body has a weight of at least 1 ton.

17. The system according to claim 11, wherein the bodies have the same shape and/or wherein the bodies have the same weight.

18. The system according to claim 11, comprising means for generating electricity from renewable sources adapted to power said motor/generator when said motor/generator acts as a motor to move a body grasped by the gripping means upwards.

19. The system according to claim 11, wherein said structure comprises a first structure and a second structure, between which there is an excavation or a ditch;
   wherein the first structure defines said upper support surface; and wherein a bottom of said excavation or a ditch defines said lower support surface.

20. The system according to claim 19, wherein each crane is arranged on a surface defined by the second structure and on said upper support surface, said surface being at a height comprised between the upper support surface and the lower support surface; or wherein each crane is arranged on said surface defined by the second structure and on a surface defined by said first structure, arranged at a height between the height of said upper support surface and the lower support surface.

* * * * *